United States Patent [19]
Eiben et al.

[11] Patent Number: 5,789,457
[45] Date of Patent: Aug. 4, 1998

[54] METHOD AND DEVICE FOR THE PRODUCTION OF FOAM USING CARBON DIOXIDE DISSOLVED UNDER PRESSURE

[75] Inventors: Robert Eiben; Wilfried Ebeling, both of Köln; Hans-Michael Sulzbach, Königswinter; Reiner Raffel, Siegburg, all of Germany

[73] Assignees: Bayer Aktiengesellschaft; Maschinenfabrik Hennecke GmbH, both of Leverkusen, Germany

[21] Appl. No.: 765,862
[22] PCT Filed: Jun. 16, 1995
[86] PCT No.: PCT/EP95/02322
 § 371 Date: Dec. 9, 1996
 § 102(e) Date: Dec. 9, 1996
[87] PCT Pub. No.: WO96/00644
 PCT Pub. Date: Jan. 11, 1996

[30] Foreign Application Priority Data

Jun. 28, 1994 [DE] Germany ............... 44 22 568.7

[51] Int. Cl.⁶ ............................................. C08G 18/14
[52] U.S. Cl. ............................. 521/130; 521/79; 521/133; 521/155; 261/38; 261/DIG. 26; 264/45.9; 264/51; 366/158.5; 366/182.1; 366/192; 366/336
[58] Field of Search ............... 261/DIG. 26, 38; 366/158.5, 182.1, 192, 336; 264/51, 45.9; 521/130, 133, 155, 79

[56] References Cited

U.S. PATENT DOCUMENTS

| | | | |
|---|---|---|---|
| 3,181,199 | 5/1965 | Voelker . | |
| 3,184,419 | 5/1965 | Merriman . | |
| 3,833,202 | 9/1974 | Crystal | 259/4 |
| 4,337,318 | 6/1982 | Doyle | 521/80 |
| 5,055,272 | 10/1991 | Wheeler et al. | 422/133 |
| 5,118,720 | 6/1992 | Wheeler et al. | 521/99 |
| 5,120,770 | 6/1992 | Doyle et al. | 521/99 |
| 5,206,082 | 4/1993 | Malone | 428/294 |
| 5,308,879 | 5/1994 | Akamatu et al. | 521/84.1 |
| 5,356,565 | 10/1994 | Southwell | 252/307 |
| 5,530,032 | 6/1996 | Wayand et al. | 521/131 |

FOREIGN PATENT DOCUMENTS 803771 10/1958 United Kingdom .

OTHER PUBLICATIONS

Database–Sec. Ch Wk. 4849–An 78-88510A & JP-A-53-123 575 (Hitachi Chemical) (Abstract).

*Primary Examiner*—John M. Cooney, Jr.
*Attorney, Agent, or Firm*—Joseph C. Gil; Noland J. Cheung

[57] ABSTRACT

A method and device are described for the production of foams from two-component reactive mixtures using carbon dioxide as expanding agent, by mixing at least one of the reactive components with carbon dioxide under pressure. That mixture is then mixed with the other reactive component(s) to form a foamable reactive mixture, which is expanded and cured to form the final product. The foamable reactive mixture is expanded to ambient pressure through at least one fine-meshed screen (21a, 21b, 21c).

12 Claims, 9 Drawing Sheets

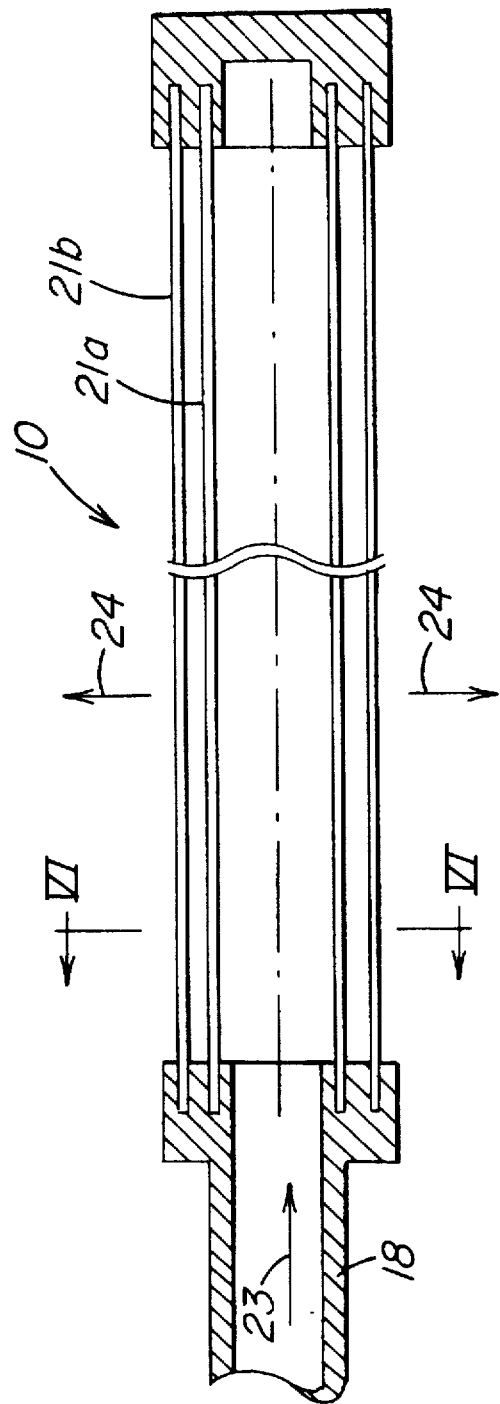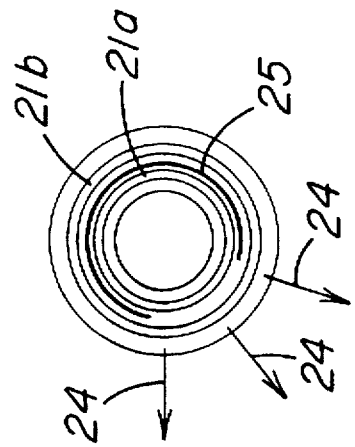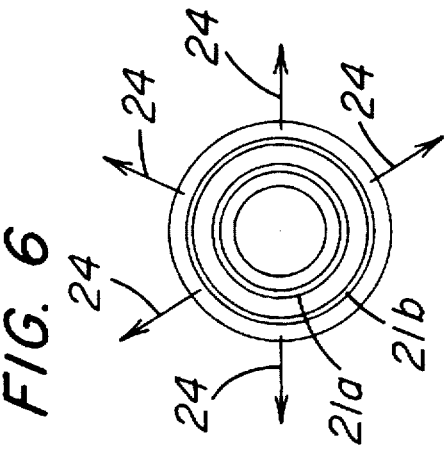

METHOD AND DEVICE FOR THE PRODUCTION OF FOAM USING CARBON DIOXIDE DISSOLVED UNDER PRESSURE

BACKGROUND OF THE INVENTION

The present invention relates to a method and a device for the production of foams using as an expanding agent carbon dioxide dissolved under pressure, whereby the substance to be expanded is mixed under pressure with preferably liquid carbon dioxide and subsequently expanded, with the formation of foam. The expandable substances used are in particular liquid starting products for plastics, which cure to form foamed plastics due to a polyaddition reaction or polycondensation reaction which commences after the expansion. The invention relates specifically to polyurethane foams.

In the production of polyurethane foams, a liquid or gaseous expanding agent is added to at least one of the reactive components (polyisocyanate and compounds containing hydrogen atoms reactive with isocyanate groups, in particular polyols). The other component is then added with mixing and the mixture obtained is conveyed either batchwise into a mold or continuously on a conveyor belt, where the mixture foams and cures.

For the production of the foam a number of methods have found wide application in practice. Liquids (such as low-molecular chlorofluoro-carbons, methylene chloride, pentane and the like) which evaporate at low temperature are often used. These materials evaporate out of the liquid reaction mixture and form bubbles. It is also possible to force air into the reaction mixture or into one of the components (mechanical foam production).

Finally, in the case of polyurethane foams s, water is often added to the polyol component as the expanding agent. After mixture with the isocyanate component, the water liberates carbon dioxide as the expanding gas by reacting with the isocyanate (chemical foam production).

Liquid carbon dioxide has already often been proposed as an expanding agent on the grounds of environmental acceptability and industrial hygiene and owing to the comparatively high solubility of liquid carbon dioxide in the polyol component. See, for example, British patent 803,771 and U.S. Pat. No. 3,184,419, 4,337,318 and 5,120,770. However, liquid carbon dioxide has not gained acceptance in practice, apparently due to the difficulties of producing uniform foams during the necessary expansion of the reaction mixture from pressures of between 10 and 20 bar. The problem is, on one hand, that the carbon dioxide vaporizes relatively suddenly so that a very large increase in volume takes place in the reaction mixture, for example, by a factor of approximately 10, which is difficult to control. On the other hand, the reaction mixture tends to inhibit release of the carbon dioxide, which can be from 3 to 6 bar below the equilibrium vapor pressure of $CO_2$ at the relevant temperature, so that a sudden explosive release of carbon dioxide occurs, with the result that large voids or bubbles are enclosed within the foam.

According to company literature from the Cannon Group, the problem of expansion by means of liquid carbon dioxide can be overcome by adding oxygen to the reaction mixture to form bubble nuclei, by carrying out the expansion in stages and by creating a special device for depositing the foam. Details of the method have not as yet been published and are not known.

BRIEF DESCRIPTION OF THE DRAWINGS

FIG. 5 shows another embodiment of the expanding device of the present invention, with FIG. 6 showing a cross section AA of the device of FIG. 5.

FIG. 7 shows a cross section of a device similar to that shown in FIG. 5.

DESCRIPTION OF THE INVENTION

Figure 1:
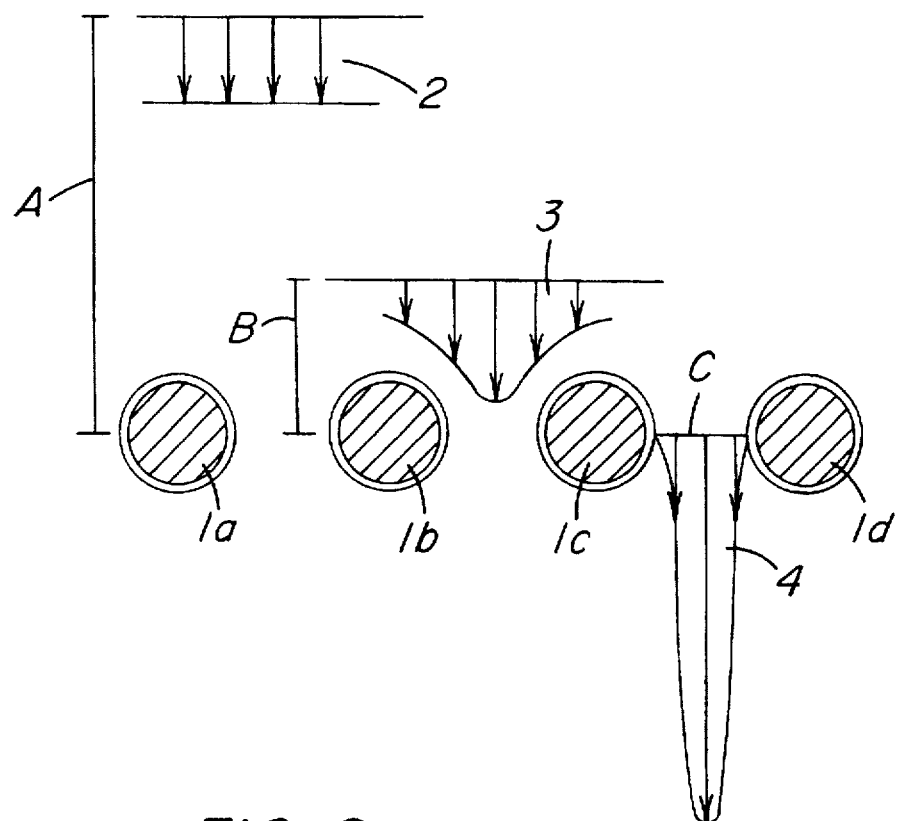
FIG. 1 illustrates the principle of the present invention.

The present invention is based on the finding that a large number of microscopic bubble nuclei are successfully produced when the reaction mixture is exposed during expansion to high shear rates of the order of from 500/sec to 5,000/sec. According to the invention, the reaction mixture containing liquid carbon dioxide is passed through a fine-meshed net, thereby expanding it. The shear rate should be preferably from 800/sec to 2,000/sec.

The present invention provides a method for the production of foams from multicomponent plastics, in particular two-component plastics, using carbon dioxide as expanding agent, by mixing at least one of the reactive components with carbon dioxide under pressure, mixing the component containing the carbon dioxide with another reactive component or the second reactive component under pressure, expanding the mixture and curing, wherein the mixture of reactive components containing the carbon dioxide is expanded at ambient pressure through at least one fine-meshed screen.

As used herein, the phrase, "mixture containing liquid carbon dioxide" means a homogeneous liquid under a pressure of at least 4 bar, wherefrom carbon dioxide is released after expansion to a pressure of less than at least 4 bar. The mixture containing liquid carbon dioxide can be prepared by dissolving gaseous or solid carbon dioxide in at least one reactive component or by mixture with liquid carbon dioxide.

Suitable fine-meshed screens are of steel or textile fabric which is resistant to the reaction mixture, which have mesh sizes of from 0.025 to 0.3 mm, preferably from 0.05 to 0.2 mm, and most preferably from 0.05 to 0.15 mm.

During the passage of the reaction mixture through screen, a velocity profile is impressed on the reaction mixture which gives rise to the high shear necessary for the production of bubble nuclei. At the same time, a very homogeneous density of bubble nuclei is produced by subdividing the flow of the reaction mixture according to the invention into a large number of individual flows during the passage through the screen, with each flow according to the invention being from 0.005 to 0.2 ml/min and the shear occurring in each individual flow.

Furthermore, for the favorable formation of bubble nuclei and of foam according to the invention, it has been found that from 60 to 80% of the screen surface is advantageously covered by the actual screen wire itself, that is, the clear width of the screen is only 20 to 40%, so that following passage through the screen there is a sufficiently large space between the individual flows of the material for a sudden explosive lateral expansion of the flow of material to take place, due to the formation of gas bubbles, without a significant sudden increase in the forward velocity.

According to the invention, perforated plates having a large number of orifices, with the sum of the diameters of the orifices amounting to a clear width of from 10 to 40%, preferably from 20 to 30% of the perforated plate, are also suitable as screens. Depending on the thickness of the plate and hence the depth of the orifices, the diameter of the orifices can also be larger than the mesh size given above for the screen fabric if, due to the depth of the orifices, a sufficiently large drop in pressure during the passage through the orifice is ensured. Although perforated plates provide a greater mechanical stability than does fabric, perforated plates are less preferred, because with perforated plates caking of cured polyurethane can occur in the clearance volumes of the flow above and below the plate.

The viscosity of the reaction mixture containing liquid carbon dioxide can be from 200 to 2,000 mPa.s, preferably from 300 to 800 mPa.s. Taking the viscosity into consideration, the shear stress of the mixture during the passage through the screen is preferably from 200 to 1,000 Pa.

The required pressure of the reaction mixture prior to the passage through the screen is dependent on the quantity of liquid carbon dioxide dissolved. Thus the equilibrium pressure is 7 bar at a carbon dioxide content of 2% by weight in the reaction mixture, and 11 bar at a carbon dioxide content of 4% by weight in the reaction mixture (the temperature of the reaction mixture is the same as the ambient temperature). According to the invention, the pressure of the reaction mixture prior to the passage through the screen is preferably 1.1 times to 1.8 times, particularly preferably 1.3 times to 1.6 times, the equilibrium pressure. In this connection the equilibrium pressure is the pressure where a carbon dioxide atmosphere present above the reaction mixture is in equilibrium with the dissolved carbon dioxide.

A pressure in excess of the equilibrium pressure is necessary prior to the passage through the screen, so that the mixture is still homogeneous on entering the screen, that is, that there is still no formation of gas bubbles prior to the passage through the screen. However according to the invention, preferably immediately prior to the mixture entering the screen, the pressure can be throttled from above equilibrium pressure to a pressure below the equilibrium pressure. Throttling can be by means of a perforated or slotted plate arranged at a distance of 0.5 to 3 mm from the screen, with the width of the orifices being from 3 to 15 mm and the free surface of the passage being from 1 to 10% of the surface of the perforated plate. The pressure of the mixture prior to entering the screen is preferably from 0.5 to 0.8 of the equilibrium pressure.

Because of the outstanding effect, in relation to the formation of bubble nuclei, of expanding the reaction mixture through the screen, the concomitant use of air or oxygen is unnecessary according to the invention.

According to the invention, immediately after the passage of the reaction mixture through the screen, a liquid polyurethane foam (froth) having a density of from 50 to 80 kg/m$^3$ is successfully produced with a charge of from 2 to 3% by weight of $CO_2$ based upon the weight of the reaction mixture. To produce foams having even lower densities, it is preferable additionally to use as an expanding agent water, which also produces carbon dioxide as an expanding gas in a reaction with isocyanate. By this means flexible foams having bulk densities of less than 15 kg/m$^3$ are successfully produced.

Although according to the invention it is in general sufficient to expand the reactive mixture through a single screen, it can be useful, and according to the invention preferable, to arrange several screens in tandem. On the one hand, industrial plants for the production of foam demand relatively high flow rates of reaction mixture, for example, in the range of from 40 to 100 l/min, so that the screen area has to be correspondingly large. Here at the pressures to be released considerable loads, which can be in the region of several tons, are exerted on the screen. The load on the individual screen can be correspondingly reduced by the arrangement of several screens in tandem. On the other hand where only a single screen is used it has on occasion been observed that the foam is insufficiently homogeneous. This is attributed to the fact that the formation of bubble nuclei is associated with a definite relaxation time which, during the very rapid expansion through only one screen, may not always be exceeded by the shear time.

According to the invention, therefore, preferably at least two screens, particularly preferably 2 to 5 screens in tandem are used. The screens are preferably not more than 5 mm apart, particularly preferably from 0.5 to 3 mm apart.

The invention is explained in more detail below with the aid of the attached Figures. FIG. 1 illustrates the principle according to the invention of producing high shear during the passage through the screen. The enlarged cross-section through filaments 1a to 1d of the screen running perpendicular to the plane of the drawing is shown. In addition the velocity profiles 2, 3 and 4 of the reaction mixture are shown at the distances A, B and C from the mid-plane of the screen.

Figure 2:
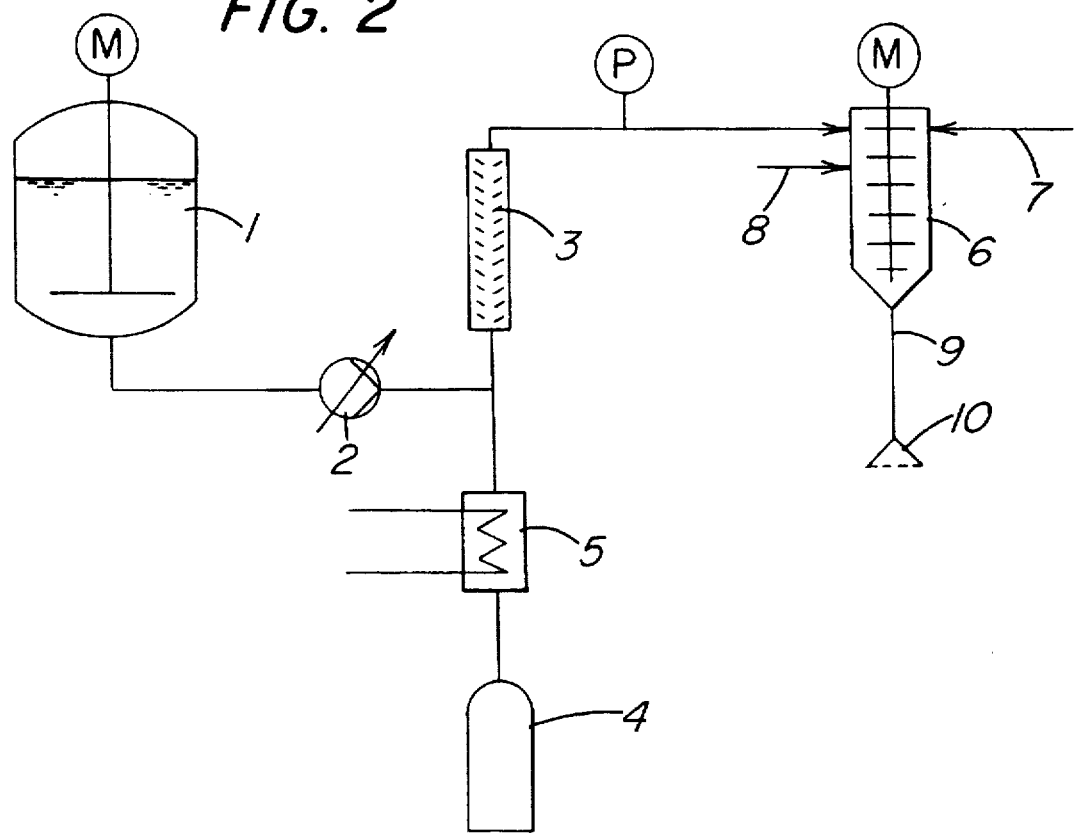
FIG. 2 is a schematic drawing showing the method of the present invention.

FIG. 2 shows schematically in general form the method for producing polyurethane foam. Polyol is pumped from a storage tank 1 via a metering pump 2 into the static mixer 3. Liquid carbon dioxide is also fed from the tank 4 via the heat exchanger 5 to the static mixer and here mixed with the polyol. The mixing in the static mixer 3 is carried out preferably at a pressure P of from 60 to 150 bar, measured at the outlet of the static mixer. The use of the heat exchanger 5 ensures that the reaction mixture remains below the critical temperature of 31° C., even after possible heat uptake from pumps and mixing units. The mixture of polyol and liquid carbon dioxide is fed to the mixing head 6, where mixing with the isocyanate (arrow 7) and other additives such as foam stabilizers (arrow 8) takes place. The expanding device 10 according to the invention is flange-mounted at the outlet 9 of the mixing head 6.

Figure 3:
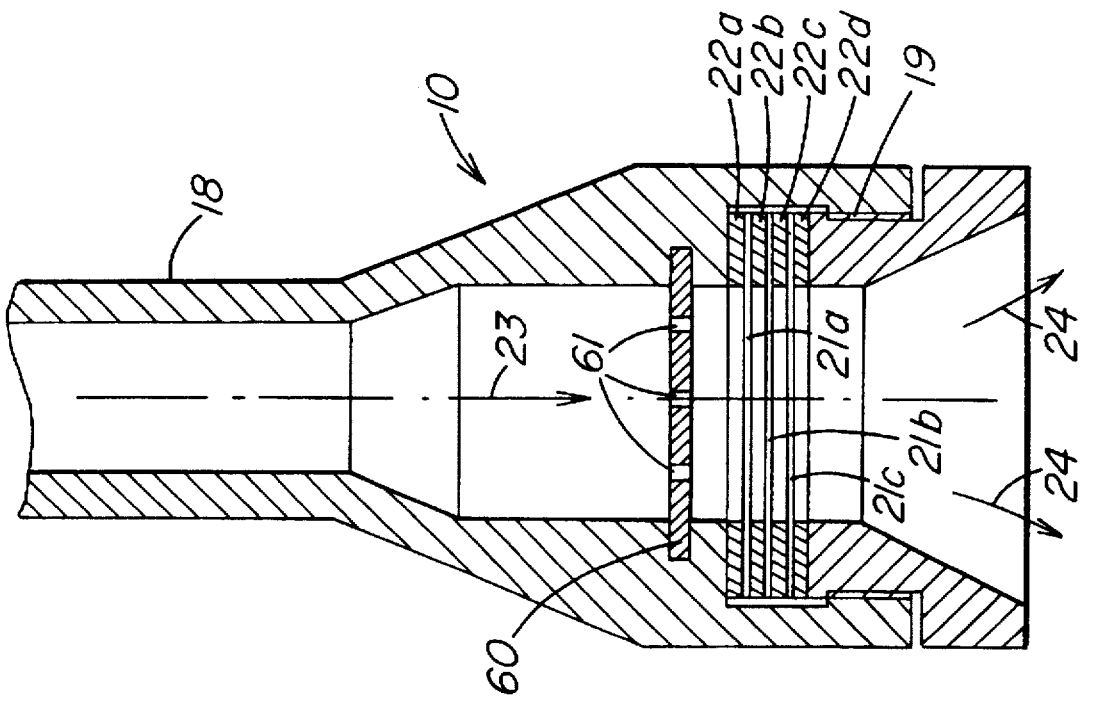
FIG. 3 shows one embodiment of the expanding device of the present invention.

FIG. 3 shows an embodiment of the expanding device 10 according to the invention. The expanding device consists of a tube 18, which can optionally have an enlargement and wherein screens 21a, 21b and 21c can be fastened at the ends by the threaded joint 19. The screens are pressed against one another by means of distance plates 22a to 22d made of a soft metal such as aluminum or copper. The reaction mixture containing liquid carbon dioxide encounters the screens in the direction of the arrow 23 and leaves as a liquid foam along arrows 24.

Figure 3A:
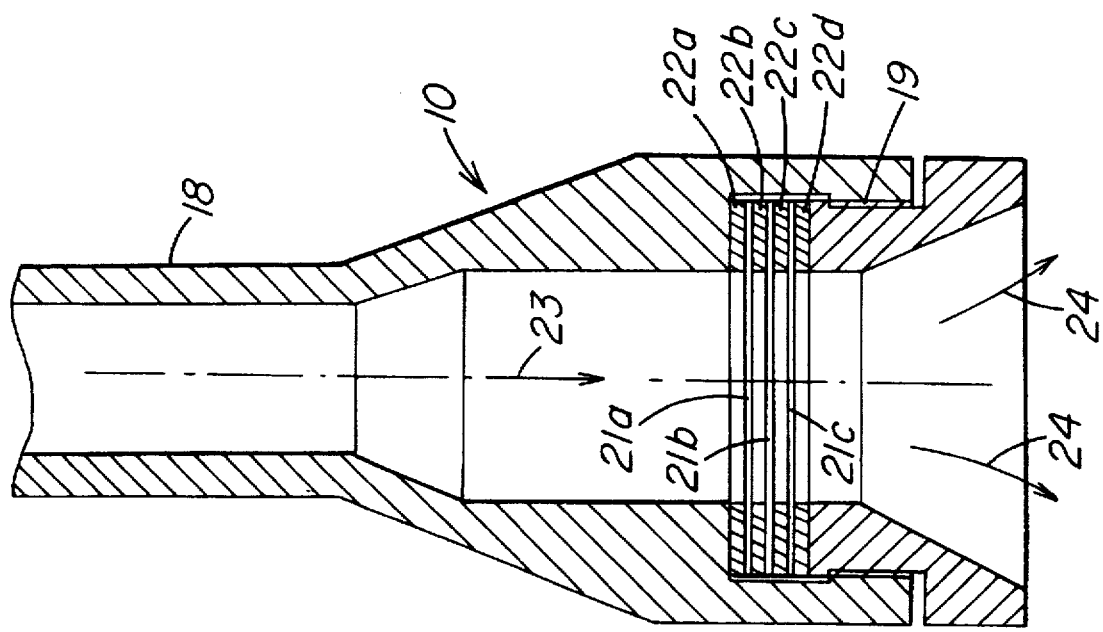
FIG. 3a shows a modification of the device of FIG. 3.

FIG. 3a shows an embodiment of the expanding device according to the invention as in FIG. 3, wherein a baffle 60 having several orifices 61 is arranged at a small distance in front of the screen. The orifices define a free cross-sectional area equal to 4% of the perforated plate.

Figure 4:
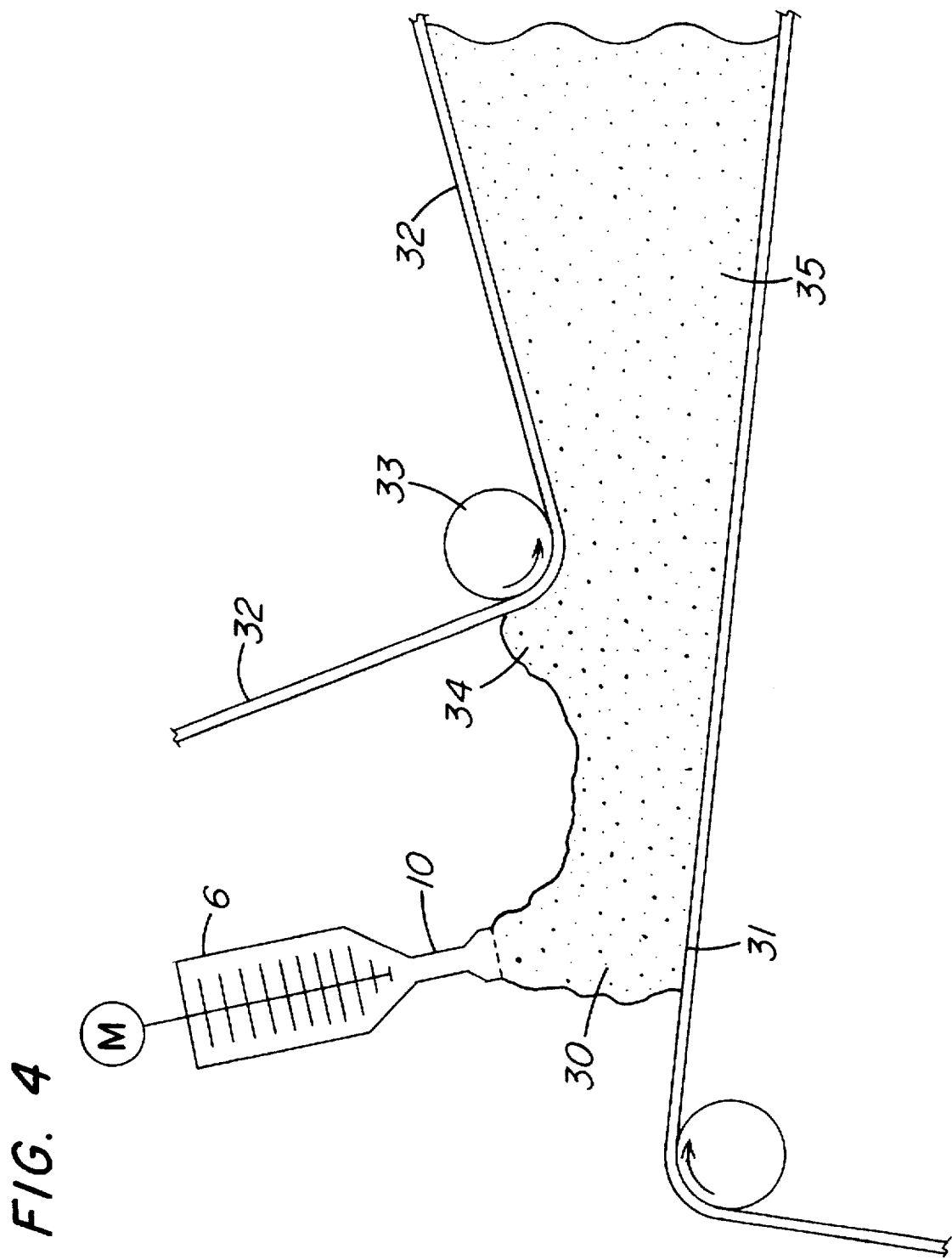
FIGS. 4 and 4a show devices for producing block foam.

FIG. 4 shows an arrangement according to the invention for the production of block foam using the foam-forming device according to the invention. From the mixing head 6 the reaction mixture passes through the foam-forming device 10, leaves as liquid foam 30 and is deposited on the lower lining sheet 31, which runs on a conveyor belt (not shown). The upper lining sheet 32 is guided over a roller 33 which dips into the foam which is deposited on the lower lining sheet 31 and thereby transported, so that a barrier 34 is formed which serves to distribute the foam over the width and to prevent the admission of air into the space between the lining sheets 31 and 32. After passing under the roller 33, the foam begins to expand further owing to the chemical reaction which now starts (35).

Figure 4A:
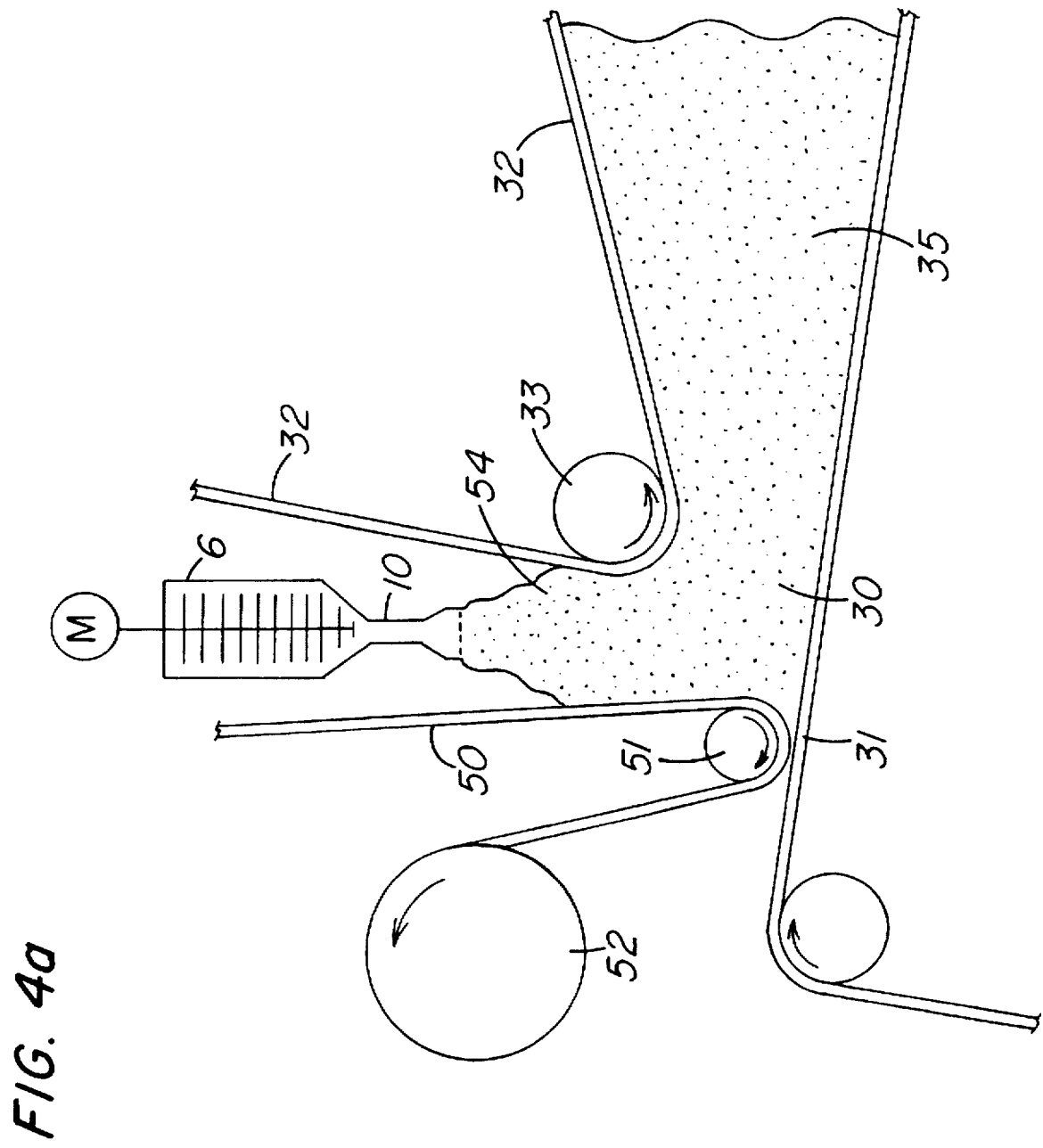

FIG. 4a shows an arrangement for the production of block foam as in FIG. 4, but with an auxiliary lining sheet 50 being conveyed from above in the direction towards the lower lining sheet 31. The auxiliary lining sheet 50 is drawn along the lower lining sheet 31 by means of a roller 51 and is led back and wound again round roller 52. The liquid foam 30 is conveyed into the trough 54 formed by the essentially vertical upper lining sheet 32 and the auxiliary lining sheet 50.

FIG. 5 shows an alternative embodiment of the expansion screen 10 according to the invention in cross-section. In this embodiment the expanding device is constructed in the form of two concentric tubular screens 21a and 21b. The reaction mixture containing liquid carbon dioxide is fed along arrow 23. The foam passes out over the entire circumference of the tubular screens. The tubular screens 21a and 21b can be of diameters in the range of only a few centimeters.

Their length can be adjusted to the width of the block foam to be produced, so that the foam is directly distributed over the width of the conveyor belt (FIG. 4). By means of such a symmetrical rotary arrangement of the screens far larger screen surfaces can be provided without serious problems of stability.

FIG. 6 shows a cross-section AA through the device as in FIG. 5.

FIG. 7 also shows a cross-section through the device as in FIG. 5 but with a cover 25 being provided so as to ensure that the exit of the foam is directed only within a segment indicated by the arrows 24, while maintaining the mechanical stability of the symmetrical rotary screens 21a and 21b. The cover unit 25 consists of a tube of the same length as the tubular screens, from which has been removed a paraxial segment of, for example, 90°. Where two screens in tandem are employed, the cover unit can be bonded between them or else mounted outside.

Figure 8:
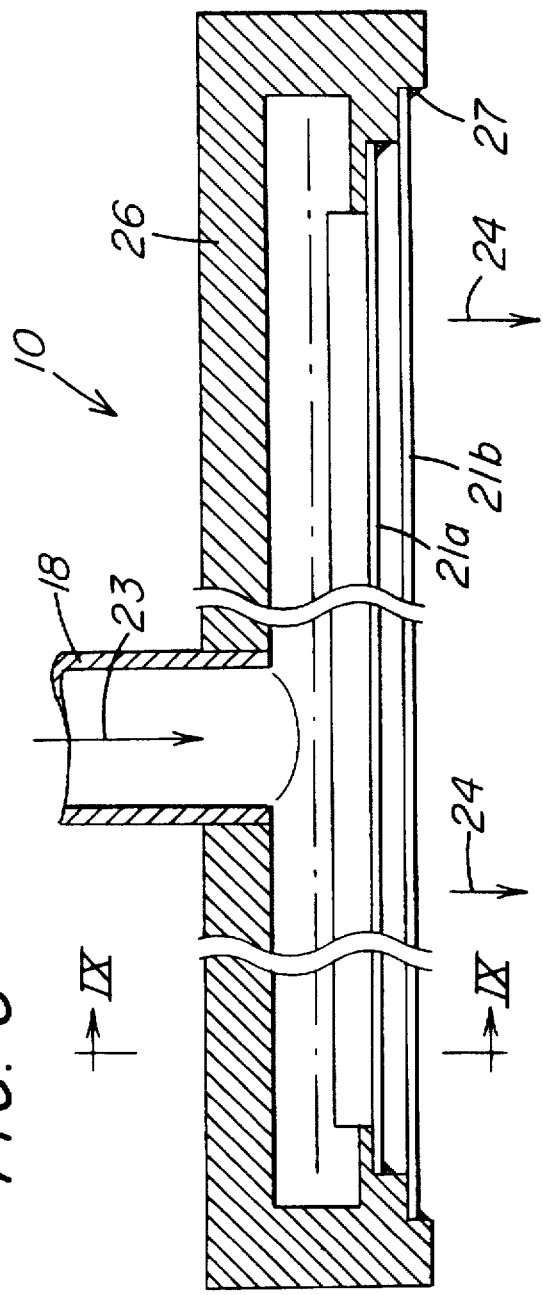
FIGS. 8 and 9 show another embodiment of the expanding device of the invention.
Figure 9:
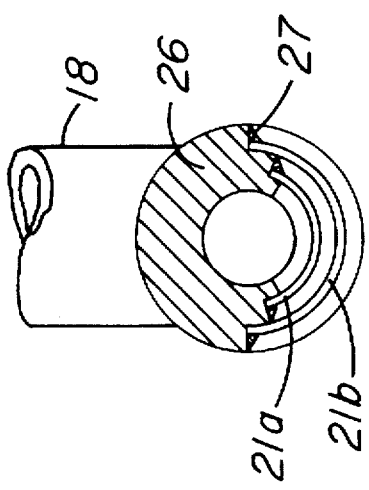

FIGS. 8 and 9 show a device 10 according to the invention consisting of a steel tube 26 closed on both sides, out of which a paraxial segment is drilled to receive the curved screen surfaces 21a and 21b. The curved steel screens can, for example, be welded on (27). The reaction mixture containing liquid carbon dioxide is fed along arrow 23 through the attached tube 18. The foam leaves along arrows 24. The width of the device can correspond to the width of the block foam to be produced.

Figure 10:
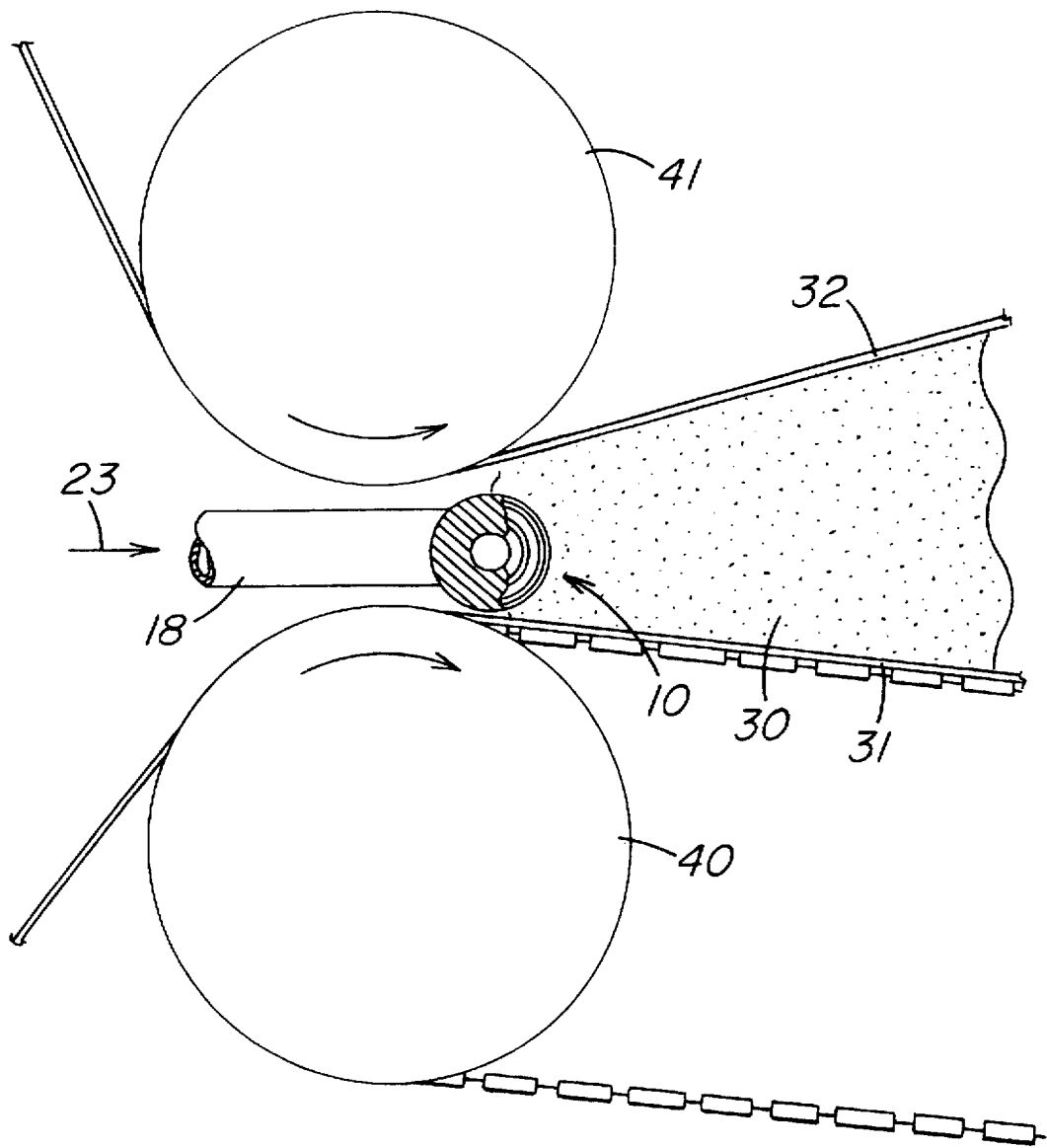
FIG. 10 shows the use of the device of FIGS. 8 and 9 for producing block foam.

FIG. 10 shows the use according to the invention of the screen devices as in FIGS. 8 and 9 for the production of block foam. The foam-forming device 10 is positioned between the deflection drums 40 and 41 which guide the lining sheets 31 and 32. Here the lining sheets 31 and 32 are preferably guided so that they slide past the foam discharging device 10, so that the admission of air between the sheets 31 and 32 is prevented. In the interest of clarity of presentation, the sheets 31 and 32 have been shown at a distance from the foam-discharging device.

Figure 11:
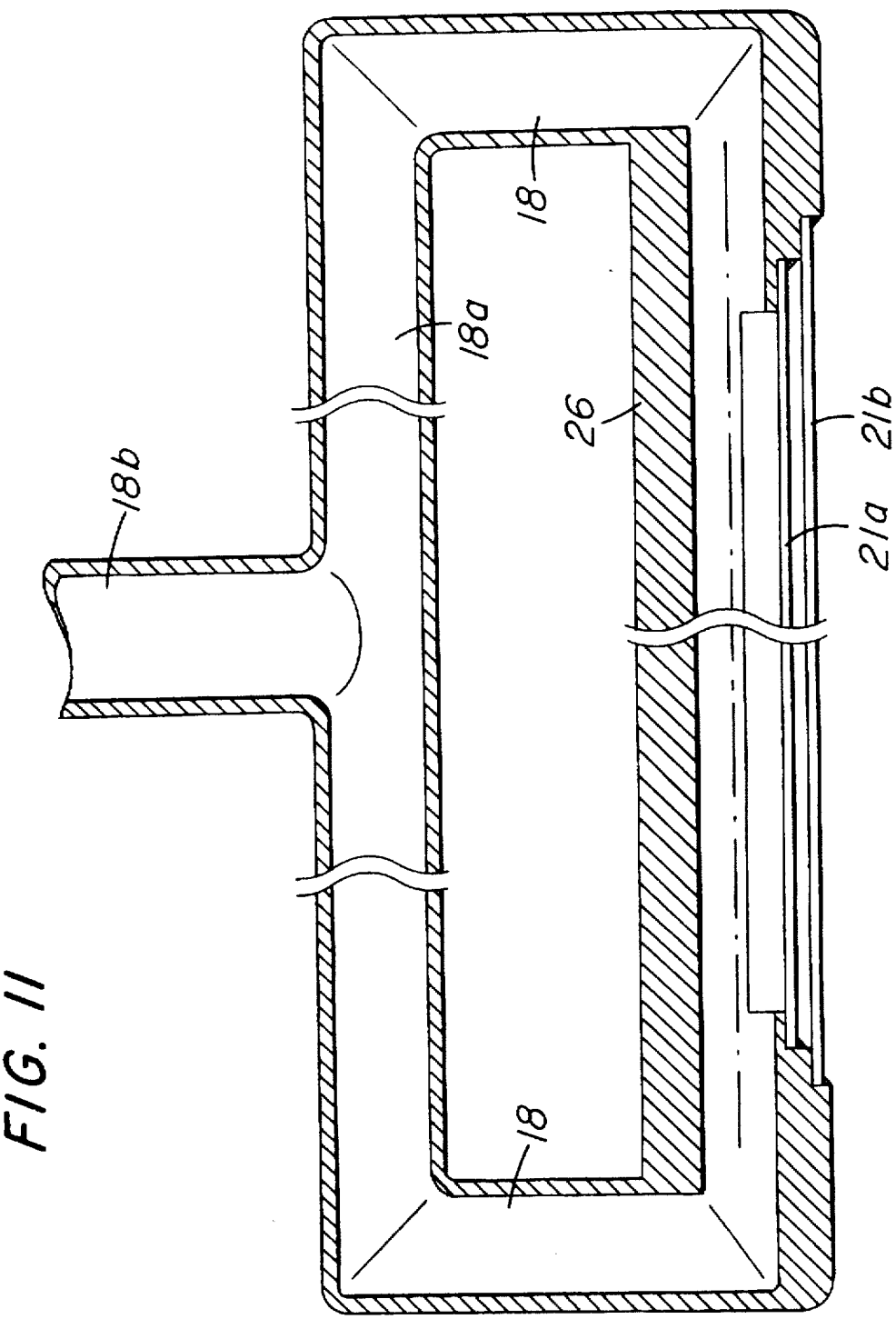
FIG. 11 shows a device similar to that shown in FIG. 8.

FIG. 11 shows a device similar to that in FIG. 8, but with the tube 26 being open at both sides and the reaction mixture being supplied through tubes 18 attached at both sides. The advantage of this embodiment of the invention is apparent from FIG. 12.

Figure 12:
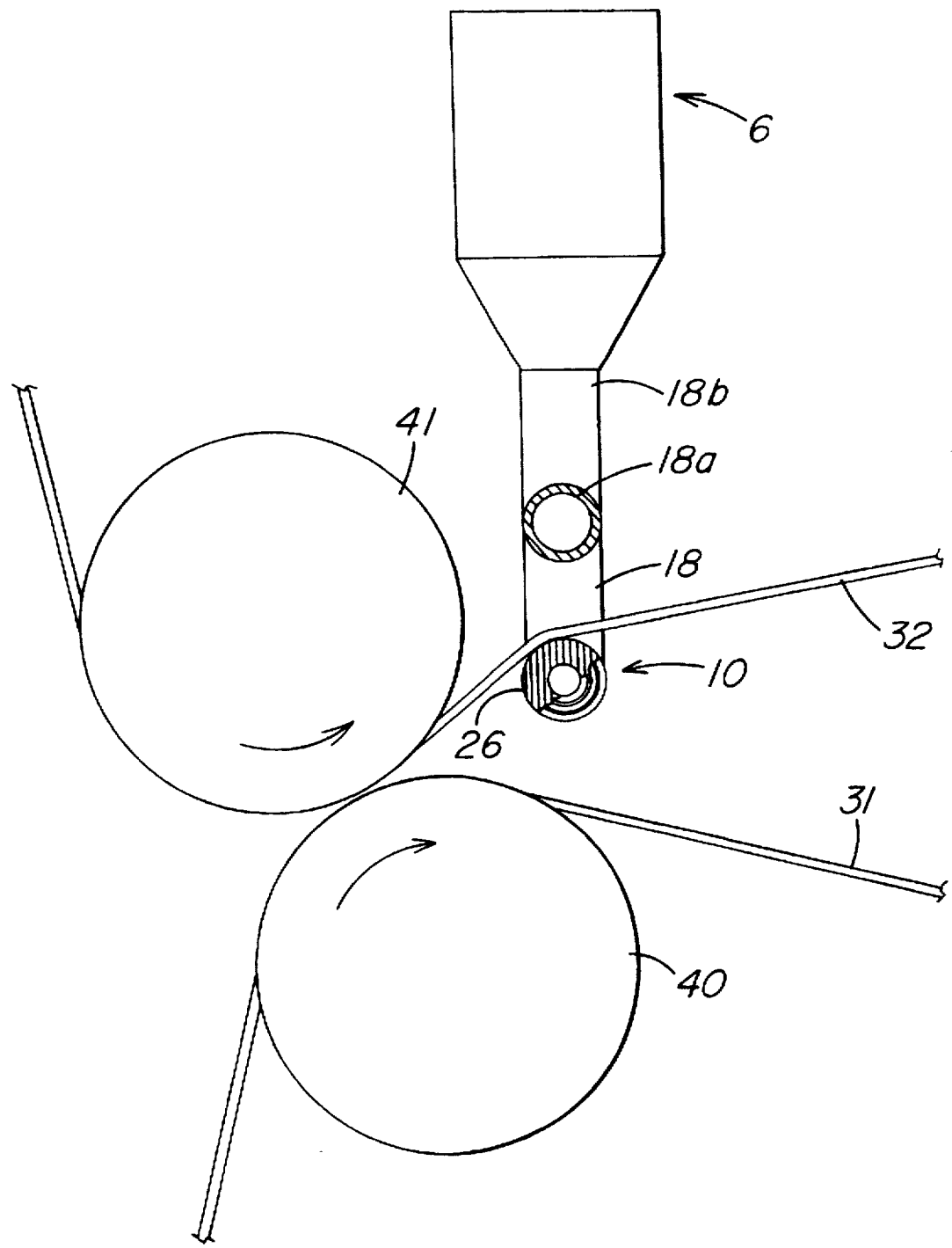
FIG. 12 shows an arrangement similar to that shown in FIG. 10.

FIG. 12 shows an arrangement similar to FIG. 10, but with the upper lining sheet 32 being guided over the side of the tube 26 turned away from the screen, so that the supply tubes 18 encompass the lining sheet 32. The deflection drums 40 and 41 can be arranged so that they are in contact with one another and thus form a space between the lining sheets 31 and 32 which is closed towards the rear.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. In a process for the production of polyurethane foams from at least two reactive components using carbon dioxide as an expanding agent, comprising mixing at least one of the reactive components with carbon dioxide under pressure thereby producing a mixture containing liquid carbon dioxide, mixing the resultant mixture with the other reactive component to form a foamable reactive mixture, expanding the reactive mixture and curing the resultant foam product, the improvement wherein the foamable reactive mixture is expanded by passing said reactive mixture through at least one meshed screen having a mesh size of from 0.025 to 0.3 mm resulting in said reactive mixture being subdivided into a plurality of individual flows at shear rates of above 500/sec.

2. In a device for the delivery of a foamable, two component reactive mixture for a polyurethane foam, which contains liquid carbon dioxide, from a mixing device where the reactive components are mixed into a mold or onto a conveyor belt, the improvement wherein at least one meshed screen having a mesh size of from 0.025 to 0.3 mm, with said screen dividing said reactive mixture into a plurality of individual flows, is located between the mold or conveyor belt and the mixing device.

3. A process according to claim 1, wherein said mesh size is from 0.05 to 0.2 mm.

4. A process according to claim 3, wherein said mesh size is from 0.05 to 0.15 mm.

5. A process according to claim 1, wherein the number of said at least one mesh screen is from at least two to five, wherein each said screen is separated from each adjacent said screen by a distance less than or equal to 5 mm.

6. A process according to claim 5, wherein said distance is from 0.5 to 3 mm.

7. A process according to claim 6, wherein liquid carbon dioxide is first mixed with polyol to form said mixture and then isocyanate is mixed with said mixture.

8. A device according to claim 2, wherein said at least one mesh screen has a mesh size of from 0.025 to 0.3 mm.

9. A device according to claim 8, wherein said mesh size is from 0.05 to 0.2 mm.

10. A device according to claim 9, wherein said mesh size is from 0.05 to 0.15 mm.

11. A device according to claim 2, wherein the number of said at least one mesh screen is from at least two to five, wherein each said screen is separated from each adjacent said screen by a distance less than or equal to 5 mm.

12. A device according to claim 2, wherein the reactive components are polyol and isocyanate, wherein said liquid carbon dioxide is mixed with said polyol to form a mixture and said mixture is mixed with said isocyanate.

* * * * *